United States Patent
Orr

(10) Patent No.: US 9,729,431 B1
(45) Date of Patent: Aug. 8, 2017

(54) USING STANDARD FIELDS TO CARRY META-INFORMATION

(75) Inventor: Michael Orr, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 104 days.

(21) Appl. No.: 13/569,622

(22) Filed: Aug. 8, 2012

Related U.S. Application Data

(60) Provisional application No. 61/524,251, filed on Aug. 16, 2011.

(51) Int. Cl.
*H04L 12/28* (2006.01)
*H04L 12/707* (2013.01)
(Continued)

(52) U.S. Cl.
CPC .......... *H04L 45/24* (2013.01); *H04L 12/4604* (2013.01); *H04L 49/354* (2013.01); *H04L 2012/5617* (2013.01)

(58) Field of Classification Search
CPC ....... H04W 80/00; H04W 4/00; H04W 28/06; H04W 28/065; H04W 40/00; H04W 80/02; H04W 88/04; H04L 12/56; H04L 45/74; H04L 29/0604; H04L 69/22; H04L 69/08; H04L 69/324; H04L 69/04; H04L 12/4633; H04L 1/0079; H04L 69/18;
(Continued)

(56) References Cited

U.S. PATENT DOCUMENTS 5,325,358 A 6/1994 Goeldner
5,404,352 A 4/1995 Pauwels et al.
(Continued)

FOREIGN PATENT DOCUMENTS

WO WO-2005/027433 A1 3/2005
WO WO-2012/093335 A1 7/2012

OTHER PUBLICATIONS

IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, Sep. 2011.
(Continued)

*Primary Examiner* — Charles C Jiang
*Assistant Examiner* — Rose Clark

(57) ABSTRACT

A method of processing one or more packets includes receiving, at a first processing unit, a first packet including first information bits. The first information bits indicate a first control parameter. The method also includes determining whether the first control parameter will be utilized to process the first packet in at least a second processing unit and, at least partially in response to determining that the first control parameter will not be utilized to process the first packet in at least the second processing unit, replacing one or more bits of the first information bits in the first packet with second information bits. The second information bits indicate a second control parameter. The method also includes providing the first packet including the second information bits to the second processing unit.

26 Claims, 5 Drawing Sheets

(51) Int. Cl.
*H04L 12/931* (2013.01)
*H04L 12/46* (2006.01)
*H04L 12/70* (2013.01)

(58) Field of Classification Search
CPC ............. H04L 12/2803; H04L 12/2821; H04L 49/3009; H04L 61/6081; H04L 12/4695; H04L 45/245; H04L 45/24; H04L 45/00
USPC ............... 370/329, 328, 392, 338, 400, 401, 370/369–370, 386–389, 466–467, 469, 370/471, 474
See application file for complete search history.

(56) References Cited

U.S. PATENT DOCUMENTS

| | | | |
|---|---|---|---|
| 6,330,614 B1* | 12/2001 | Aggarwal | H04L 29/06 370/389 |
| 6,415,329 B1* | 7/2002 | Gelman | H04L 12/66 370/401 |
| 6,731,644 B1 | 5/2004 | Epps et al. | |
| 6,975,627 B1* | 12/2005 | Parry | H04L 12/4666 370/389 |
| 7,643,486 B2 | 1/2010 | Belz et al. | |
| 7,706,363 B1 | 4/2010 | Daniel et al. | |
| 7,869,432 B1* | 1/2011 | Mollyn | 370/389 |
| 8,087,064 B1* | 12/2011 | Baum | H04L 12/4633 705/73 |
| 8,514,723 B2* | 8/2013 | Malomsoky et al. | 370/241 |
| 8,792,353 B1* | 7/2014 | Janarthanan | H04L 47/10 370/236 |
| 8,953,590 B1 | 2/2015 | Aggarwal et al. | |
| 2001/0053159 A1* | 12/2001 | Bunn | H04L 12/2801 370/487 |
| 2003/0231625 A1 | 12/2003 | Calvignac et al. | |
| 2004/0071142 A1 | 4/2004 | Moriwaki et al. | |
| 2006/0002386 A1 | 1/2006 | Yik et al. | |
| 2006/0251074 A1* | 11/2006 | Solomon | 370/392 |
| 2007/0098006 A1* | 5/2007 | Parry et al. | 370/437 |
| 2007/0160042 A1 | 7/2007 | Dollo et al. | |
| 2007/0271588 A1* | 11/2007 | Bunn | A01N 35/02 725/111 |
| 2008/0013547 A1* | 1/2008 | Klessig et al. | 370/395.53 |
| 2009/0279548 A1 | 11/2009 | Davis et al. | |
| 2010/0054251 A1* | 3/2010 | Lee | H04L 12/4641 370/392 |
| 2010/0080123 A1* | 4/2010 | Kahn | H04W 80/04 370/235 |
| 2011/0128974 A1* | 6/2011 | Breslin et al. | 370/474 |
| 2011/0134925 A1 | 6/2011 | Safrai et al. | |
| 2011/0205959 A1* | 8/2011 | Aalto et al. | 370/328 |
| 2011/0271082 A1* | 11/2011 | Smith | H04L 49/3063 712/208 |
| 2012/0023552 A1* | 1/2012 | Brown | H04L 63/14 726/3 |
| 2012/0033669 A1 | 2/2012 | Mohandas et al. | |
| 2012/0177047 A1 | 7/2012 | Roitshtein | |
| 2012/0182866 A1* | 7/2012 | Vinayagam et al. | 370/228 |
| 2012/0300772 A1* | 11/2012 | Manzella et al. | 370/389 |
| 2013/0258963 A1* | 10/2013 | Mihaly et al. | 370/329 |

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," the *The Institute of Electrical and Electronics Engineers, Inc.*, 363 pages (Feb. 10, 2012).

IEEE Std 802.3.-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5 (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).

IEEE Std 802.11e/D11.0, "IEEE Standard for Information technology—Telecommunications and information exchange between systems—Local and metropolitan area networks—Specific requirements: Amendment 7: Medium Access Control (MAC) Quality of Service (QoS) Enhancements," *The Institute of Electrical and Electronics Engineers, Inc.*, pp. 1-196 (Oct. 2004).

IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput i the 60 GHz Band," *The Institute of Electrical and Electronics Engineers, Inc.*, Sep. 2011.

International Preliminary Report on Patentability in International Application No. IB2012/0000131, dated Jul. 10, 2013 (7 pages).

International Search Report and Written Opinion in International Application No. IB2012/0000131, dated May 8, 2012 (10 pages).

* cited by examiner

USING STANDARD FIELDS TO CARRY META-INFORMATION

CROSS-REFERENCE TO RELATED APPLICATION

This disclosure claims the benefit of U.S. Provisional Patent Application No. 61/524,251, entitled "Using Standard Packet Fields As Meta-Information Carrier," which was filed on Aug. 16, 2011, the disclosure of which is hereby incorporated by reference herein in its entirety.

FIELD OF TECHNOLOGY

The present disclosure relates generally to communication networks and, more particularly, to packet processing within one or more network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some networks, packet processing units within a single network device (e.g., a network switch), and/or network devices within a single system, typically make decisions about received packets and convey information reflecting those decisions to other processing units and/or devices. For example, a first processing unit of a pipeline in a network device may determine that a packet was received on a particular port, and convey the port number to one or more subsequent processing units in the pipeline that perform some processing based on the port number. In other examples, other types of information about received packets (i.e., packet "metadata") are determined and conveyed to subsequent processing units. Received packets that conform to a particular communication protocol, however, may not include any bits or fields allocated to the type of information to be conveyed to the subsequent processing units.

Vendors have addressed this problem in various, vendor-specific ways, such as lengthening packets by inserting additional preamble fields to convey the additional information. Because techniques such as this are not standardized, however, the techniques generally work only between units or devices of the same vendor, and in some cases work only for specific models of the vendor. Moreover, some of these vendor-specific schemes do not work if a packet path between sender and receiver includes any systems that are not designed to participate in the scheme. For example, appending an additional preamble field generally does not allow any third party systems to be included in the packet path, and prevents the scheme from being used for links that do not include preambles, such as optical links.

SUMMARY

In one embodiment, a method of processing one or more packets includes receiving, at a first processing unit, a first packet including first information bits. The first information bits indicate a first control parameter. The method also includes determining whether the first control parameter will be utilized to process the first packet in at least a second processing unit and, at least partially in response to determining that the first control parameter will not be utilized to process the first packet in at least the second processing unit, replacing one or more bits of the first information bits in the first packet with second information bits. The second information bits indicate a second control parameter. The method further includes providing the first packet including the second information bits to the second processing unit.

In another embodiment, a network device includes a first processing unit configured to receive a packet including first information bits. The first information bits indicate a first control parameter. The first processing unit includes a pattern matching module configured to determine whether the first control parameter will be utilized to process the packet in at least a second processing unit. The first processing unit also includes a bit writing module configured to, at least partially in response to a determination by the pattern matching module that the first control parameter will not be utilized to process the packet in at least the second processing unit, replace one or more bits of the first information bits in the packet with second information bits. The second information bits indicate a second control parameter. The first processing unit is further configured to provide the packet including the second information bits to the second processing unit.

In another embodiment, a method of processing one or more packets includes receiving, at a first processing unit, a first packet including (i) first information bits arranged in a first field, and (ii) second information bits arranged in a second field. The first field corresponds to a first control parameter according to a protocol, and the second field corresponds to a second control parameter according to the protocol. The method also includes determining which of a plurality of control parameters will or may be utilized to process the first packet in at least a second processing unit. The plurality of control parameters includes at least the second control parameter and a third control parameter. The protocol does not define a corresponding field for the third control parameter. The method further includes, at least partially in response to a determination that the third control parameter will or may be utilized to process the first packet in at least the second processing unit, replacing (i) one or more bits of the second information bits in the first packet with third information bits, and (ii) one or more bits of the first information bits in the first packet with fourth information bits. The third information bits indicate the third control parameter, and the fourth information bits indicate the third control parameter is available. The method further includes providing the first packet including the third information bits and the fourth information bits to the second processing unit.

In another embodiment, a network device includes a first processing unit configured to receive a packet including (i) first information bits arranged in a first field, and (ii) second information bits arranged in a second field. The first field corresponds to a first control parameter according to a protocol, and the second field corresponds to a second control parameter according to the protocol. The first processing unit includes a pattern matching module configured to determine which of a plurality of control parameters will or may be utilized to process the packet in at least a second processing unit. The plurality of control parameters includes at least the second control parameter and a third control parameter. The protocol does not define a corresponding field for the third control parameter. The first processing unit also includes a bit writing module configured to, when the pattern matching module determines that the third control parameter will or may be utilized to process the packet in at least the second processing unit, (i) replace one or more bits of the second information bits in the packet with third information bits, and (ii) replace one or more bits of the first information bits in the packet with fourth information bits. The third information bits indicate the third control parameter, and the fourth information bits indicate the third control parameter is available. The first processing unit is further configured to provide the packet to the second processing unit.

DETAILED DESCRIPTION

In embodiments described below, a control field that conforms to a standard communication protocol (referred to herein as a "standard-defined" or "protocol-defined" control field) is "repurposed" by overwriting the control field bits in a received packet with information bits indicating a different control parameter not defined by the standard protocol (referred to herein as a "non-standard" or "non-protocol" control parameter). Moreover, in some embodiments, the protocol-defined field is overwritten in response to a decision that the protocol-defined field will not be utilized, allowing the control field to be dynamically repurposed rather than automatically overwriting the control field as a matter of convention. Further, in some embodiments, multiple protocol-defined fields are overwritten, increasing the amount of new information that can be conveyed to different units or devices. In some of these latter embodiments, the bits of a first protocol-defined control field are overwritten with bits indicating a non-protocol control parameter, while the bits of a second protocol-defined control field are overwritten with "metadata tag" bits indicating that the non-protocol control parameter is available for processing in one or more subsequent processing units or devices. Although the techniques described herein are not standardized (i.e., are not defined by any standard body), the use of standard-defined fields to carry non-standard information allows other systems in the packet path to process the packet without participating in, or even having knowledge of, the non-standardized techniques. From the perspective of these other systems, a fully standard-compliant packet is processed.

Figure 1:
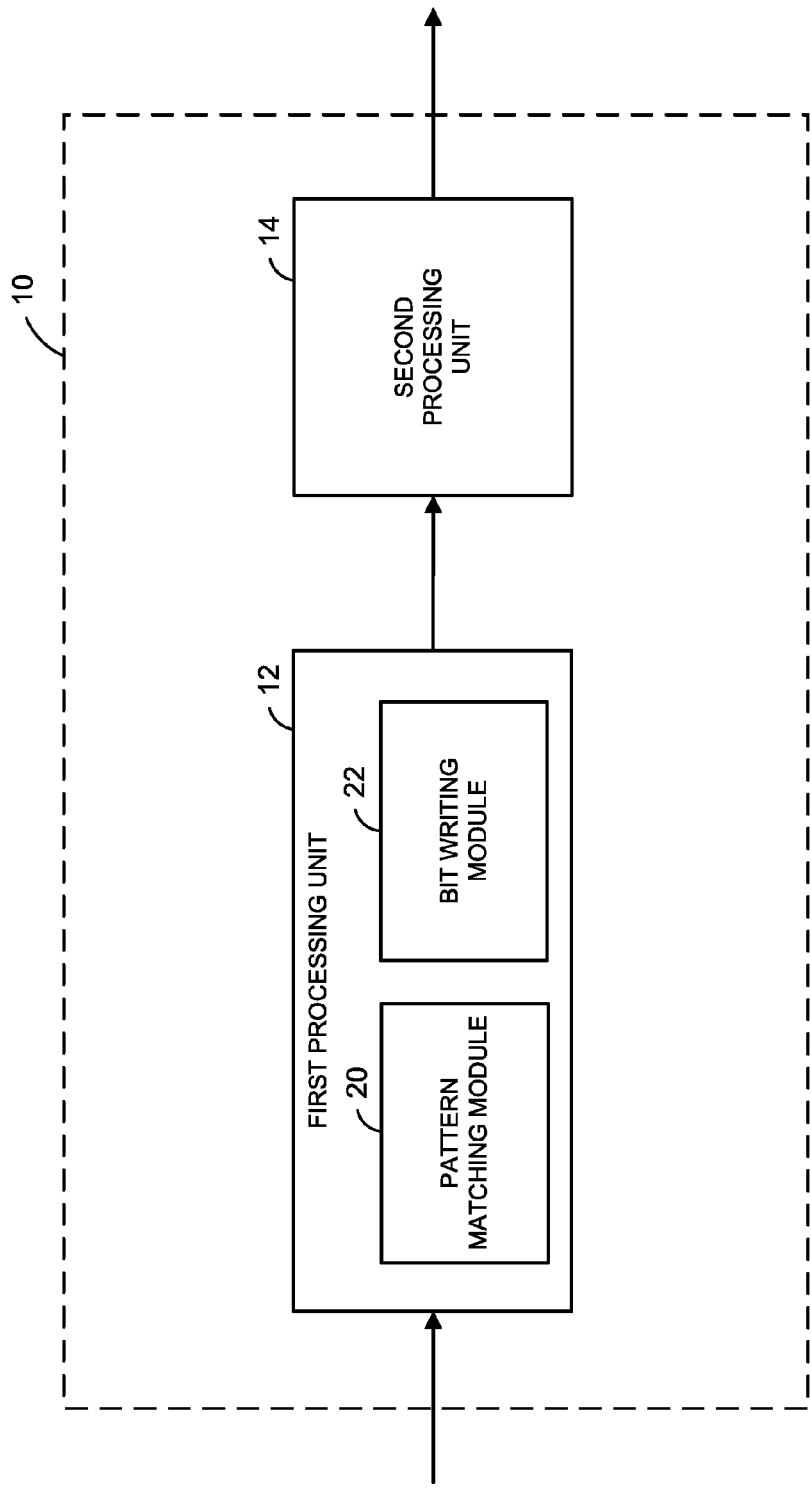
FIG. 1 is a block diagram of an example system, in a network, that utilizes dynamic bit repurposing techniques of the present disclosure, according to an embodiment.

FIG. 1 is a block diagram of a system 10, in a network, that utilizes dynamic bit repurposing techniques of the present disclosure, according to an embodiment. The system 10 includes at least a first processing unit 12 and a second processing unit 14. In some embodiments, the system 10 is a single network device (e.g., a switching device), and the processing units 12, 14 are processing engines, or stages of one or more processing engines, within the system 10. For example, the processing units 12, 14 are units in a hardware pipeline in a single network device (e.g., in one or more application specific integrated circuits (ASICs) in the device), in an embodiment. In other embodiments, the processing units 12, 14 are different network devices, or processing engines or engine stages within different network devices, within the system 10. In an embodiment, processing units 12, 14, and any other processing units in system 10, are designed to operate as a single logical unit that appears to the rest of the network as a single unit.

In an embodiment, the system 10 operates in a network utilizing packets that are arranged according to a standard communication protocol, such as an Ethernet protocol, for example. In one embodiment, for example, the network utilizes packets arranged according to the IEEE 802.1D protocol, which includes control fields such as a destination media access control (MAC) address, source MAC address, and user priority, for example, in addition to a payload field. As described in further detail below, however, the system 10 is designed to convey additional information (not specified by the protocol of the received packets) from the first processing unit 12 to the second processing unit 14, without necessarily increasing the length of each received packet.

In an embodiment, the first processing unit 12 is coupled directly or indirectly (e.g., via one or more additional processing units not seen in FIG. 1) to one or more ports. For example, in one embodiment where the system 10 is a single network device (e.g., a switching device), the first processing unit 12 is coupled to one or more ports (e.g., ingress ports, or ports that can selectively be used as ingress ports or egress ports, etc.) of the system 10. As another example, in one embodiment where the system 10 includes multiple network devices, the first processing unit 12 is coupled to one or more ingress ports of one of the network devices. In an embodiment, the second processing unit 14 is also coupled, directly or indirectly, to one or more ports, such as egress ports (or ports that can selectively be used as ingress ports and/or egress ports) of a network device.

Generally, the first processing unit 12 processes received packets, and determines whether the second processing unit 14 is configured to ignore any standard fields in the packets. If the first processing unit 12 determines that the second processing unit 14 will ignore any standard fields or bits, some or all bits of those standard fields/bits are replaced with useful metadata not defined by the standard. The second processing unit 14 then implements additional, non-standard services based on the newly added, non-standard metadata, in an embodiment. If the first processing unit 12 instead determines that the second processing unit 14 will not (or may not) ignore any standard fields or bits, no bits are repurposed to provide non-standard metadata to the second processing unit 14.

In an embodiment, the second processing unit 14 utilizes pattern matching in a "match-and-act" scheme (e.g., by selectively performing different packet operations based on whether the information bits in particular fields match particular patterns). In one such embodiment, the first processing unit 12 determines which fields/bits in a received packet will be subject to pattern matching in the second processing unit 14, and replaces some or all of the fields/bits (if any) that will not be subject to pattern matching with non-standard metadata.

By dynamically determining which (if any) standard fields or bits will be replaced with non-standard metadata, the techniques described above allow a large degree of flexibility. In some embodiments, this flexibility is greatly increased by utilizing combinations with "if/then" logic. For example, in one embodiment, the first processing unit 12 overwrites a first standard control field with a first type of non-standard metadata if a second standard control field has a first value, and overwrites the first standard control with a different, second type of non-standard metadata if the second control field has a different, second value (e.g., overwrite standard field X with metadata/information A1 if standard field Y contains a first value or pattern, or with metadata/information A2 if standard field Y contains a second value or pattern). In other embodiments, other suitable combinations and logic are used to determine which standard control fields (or portions thereof) are repurposed to include non-standard metadata, and/or to determine which type of non-standard metadata to include.

To determine whether any protocol-defined control field(s) will be utilized (or, alternatively, may be utilized) by the second processing unit 14, the first processing unit 12 of the example system 10 includes a pattern matching module 20. In an embodiment, the pattern matching module 20 compares specific bits or bit sequences within a received packet to one or more reference patterns in order to make decisions about the received packet. For example, in one embodiment where the system 10 is a network device utilizing policy-based switching, and where received packets include a destination IP address field as defined by a standard protocol, the pattern matching module 20 compares the bits in the destination IP address field to a reference pattern corresponding to the IP address of the system 10. In this example embodiment, the pattern matching module 20 determines that a received packet is intended for the system 10 if the IP destination address in the received packet matches the reference pattern, and determines that the received packet is not intended for the system 10 if the IP destination address does not match the reference pattern. In some embodiments, the one or more reference patterns are stored in a memory not seen in FIG. 1, such as a dynamic random access memory (DRAM) and/or an addressable memory such as a ternary content-addressable memory (TCAM), for example. In various embodiments, the memory is included in the first processing unit 12, or elsewhere in system 10. In other embodiments, the memory is not included in system 10. For example, in one embodiment where the system 10 is a single network device, the first processing unit 12 (e.g., pattern matching module 20) retrieves the reference pattern(s) from one or more memories included in one or more other network devices.

Based on the determination(s) by the pattern matching module 20, a bit writing module 22 in the first processing unit 12 selectively either overwrites or does not overwrite one or more bits corresponding to one or more protocol-defined control fields. In one embodiment, the bit writing module 22 overwrites the bit(s) of one or more protocol-defined control fields of a particular packet when the pattern matching module 20 determines that the control parameter(s) corresponding to the protocol-defined control field(s) will not be utilized to process that packet. For example, in one embodiment, the bit writing module 22 overwrites the bits of a protocol-defined destination MAC address field of a particular received packet if the pattern matching module 20 determines that the second processing unit 14 (and, in some embodiments, other units within system 10) will not utilize the destination MAC address of that packet, and therefore does not need to know the destination MAC address. As a more specific example, in an embodiment where the system 10 is a network device utilizing policy-based switching and the pattern matching module 20 determines that a received packet includes a destination IP address of a different device, the first processing unit 12 knows that the second processing unit 14 can safely ignore the destination MAC address, and the bit writing module 22 therefore overwrites the destination MAC address with other, non-protocol control information. In this example embodiment, the first processing unit 12 then provides the modified packet to the second processing unit 14 for routing services, as well as services based on the newly added, non-protocol control information.

In some embodiments and/or scenarios, the bit writing module 22 overwrites the bit(s) of one or more protocol-defined control fields if the pattern matching module 20 determines that a received packet belongs to a same packet flow as a particular previous packet. A packet "flow" can be defined based on one or more attributes shared by each packet included in the flow. For example, a packet flow can be defined to include packets having identical (or, in some embodiments, sufficiently similar) packet header information with respect to one or more attributes such as protocol type, IP version, virtual LAN (VLAN), source or destination MAC address, source or destination IP address, Layer-4 ports (e.g., source or destination ports for transmission control protocol (TCP), user datagram protocol (UDP), or stream control transmission protocol (SCTP)), multiprotocol label switching (MPLS) labels, physical source and destination ports of the router/switch, virtual source and destination ports of the router/switch, etc.

The information bit(s) that the bit writing module 22 uses to replace the bits of the protocol-defined field(s) in the received packet are bits that indicate a different control parameter that is not defined by the protocol, in an embodiment. For example, in one embodiment, the bit writing module 22 replaces the bits of a protocol-defined destination MAC field with bits indicating a port via which the packet was received by the first processing unit 12 (e.g., a port number, or a link aggregation group (LAG) number associated with the receive port, etc.), where the protocol does not allocate any fields or bits to an indication of the receive port. In some of these embodiments, the second processing unit 14 uses the indication of the receive port to determine which ports to broadcast a packet on (e.g., such that the packet is not broadcast on the same port(s) that received the packet, and/or is not broadcast on any ports having the same LAG number(s) as the port(s) that received the packet). In other of these embodiments, the second processing unit 14 uses the indication of the receive port to determine paths according to a spanning tree protocol (e.g., where the received packet is a bridge protocol data unit (BPDU)).

In some embodiments and/or scenarios, the bit writing module 22 overwrites only a portion of the bits within one or more protocol-defined control fields. For example, when repurposing a six-byte MAC address, the first two bits, middle two bits, last two bits, middle four bits, etc., are replaced with non-protocol metadata, in various different embodiments and scenarios. Moreover, a single, protocol-defined control field is repurposed to include two or more non-protocol control fields, in one embodiment and scenario. For example, when repurposing a six-byte MAC address, the first two bytes are replaced with metadata indicating a first non-protocol control field, and the last four bytes are replaced with metadata indicating a second non-protocol control field, in one embodiment and scenario. Thus, non-protocol control fields do not necessarily align with any protocol-defined control field boundaries, or even with byte boundaries within any protocol-defined control fields, and do not necessarily replace all of the bits within a protocol-defined control field.

While the example system 10 has been described at times above with reference to an embodiment in which the bit writing module 22 selectively overwrites the destination MAC address of received packets, other embodiments instead (or additionally) selectively overwrite bits of one or more other protocol-defined control fields, such as a source MAC address, a VLAN header field (e.g., VID, priority, or CFI) or QinQ field, Layer-3 protocol and priority (DSCP) bits, a Layer-4 port field, or a tunneling field (e.g., a generic routing encapsulation (GRE) header), for example. Similarly, while the example system 10 has been described above with reference to an embodiment in which the bit writing module 22 selectively overwrites a protocol-defined field with information indicating a port on which the packet was received, other embodiments instead (or additionally) selectively overwrite the protocol-defined field(s) with bits indicating other metadata, such as whether a received packet exceeds a quota for a particular user (and is therefore discard eligible), for example.

In some embodiments, the second processing unit 14 (or a different unit within system 10) restores one or more overwritten, protocol-defined fields of received packets before the packet is forwarded to a device or unit outside of system 10. In this manner, the operations of the first processing unit 12 and/or the system 10 as a whole may be transparent to the rest of the network. In one such embodiment, the bit(s) of any overwritten field(s) are stored in a memory prior to being overwritten by the bit writing module 22. In various embodiments, the memory is included in the first processing unit 12, elsewhere in the system 10, or in a device or unit outside of system 10. After the bits of the original field have been overwritten with new bits corresponding to a different control parameter, and (in some scenarios) after the second processing unit 14 has processed the new bits, the original bits are retrieved from the memory (e.g., by the second processing unit 14, or by another unit in system 10) and restored to their original locations in the received packet, in an embodiment.

In some embodiments, the first processing unit 12 overwrites two or more protocol-defined control fields that the second processing unit 14 does not utilize for processing a particular packet. For example, in one embodiment and scenario where the pattern matching unit 20 determines that a first and a second protocol-defined control field will not be utilized by the second processing unit 14, the bit writing module 22 overwrites the first protocol-defined field (or a portion thereof) with bits indicating a new control parameter that is not defined by the protocol, and overwrites the second protocol-defined field (or a portion thereof) with metadata tag bits indicating that the new non-protocol control parameter is available for processing by the second processing unit 14. In this manner, any one or more of a plurality of control parameters not defined by the protocol can be used to overwrite a first protocol-defined field of the packet, and the second processing unit 14 can determine which of the plurality of non-protocol control parameters is indicated in the packet by examining the contents of the overwritten, second protocol-defined field serving as the metadata tag.

As a more specific example, in one embodiment and scenario, the pattern matching module 20 determines that protocol-defined user priority and VLAN identifier fields of a packet will not be utilized by the second processing unit 14, but that the second processing unit 14 will (or may) need to know the receive port of the first packet. In response, in this embodiment, the bit writing module 22 replaces the user priority bits with bits indicating the receive port number of the first packet, and replaces the VLAN identifier bits with metadata tag bits indicating to the second processing unit 14 that the receive port number of the first packet is an available control parameter. In various other embodiments, a protocol-defined field of a tunneling header (e.g., a GRE sequence number field), or a different, suitable protocol-defined field of a received packet, is overwritten with a metadata tag to indicate to the second processing unit 14 which non-protocol control parameter is available.

In some embodiments, VLAN tagging cannot be implemented in one or more processing units of the system 10 (including at least the second processing unit 14) if the VLAN field is overwritten with metadata tag bits to indicate which control parameter(s) is/are available. In some embodiments where QinQ VLAN tagging is implemented (per the IEEE 802.1ad standard), however, the internal tag is overwritten with metadata tag bits while the external tag retains its original function.

Figure 2:
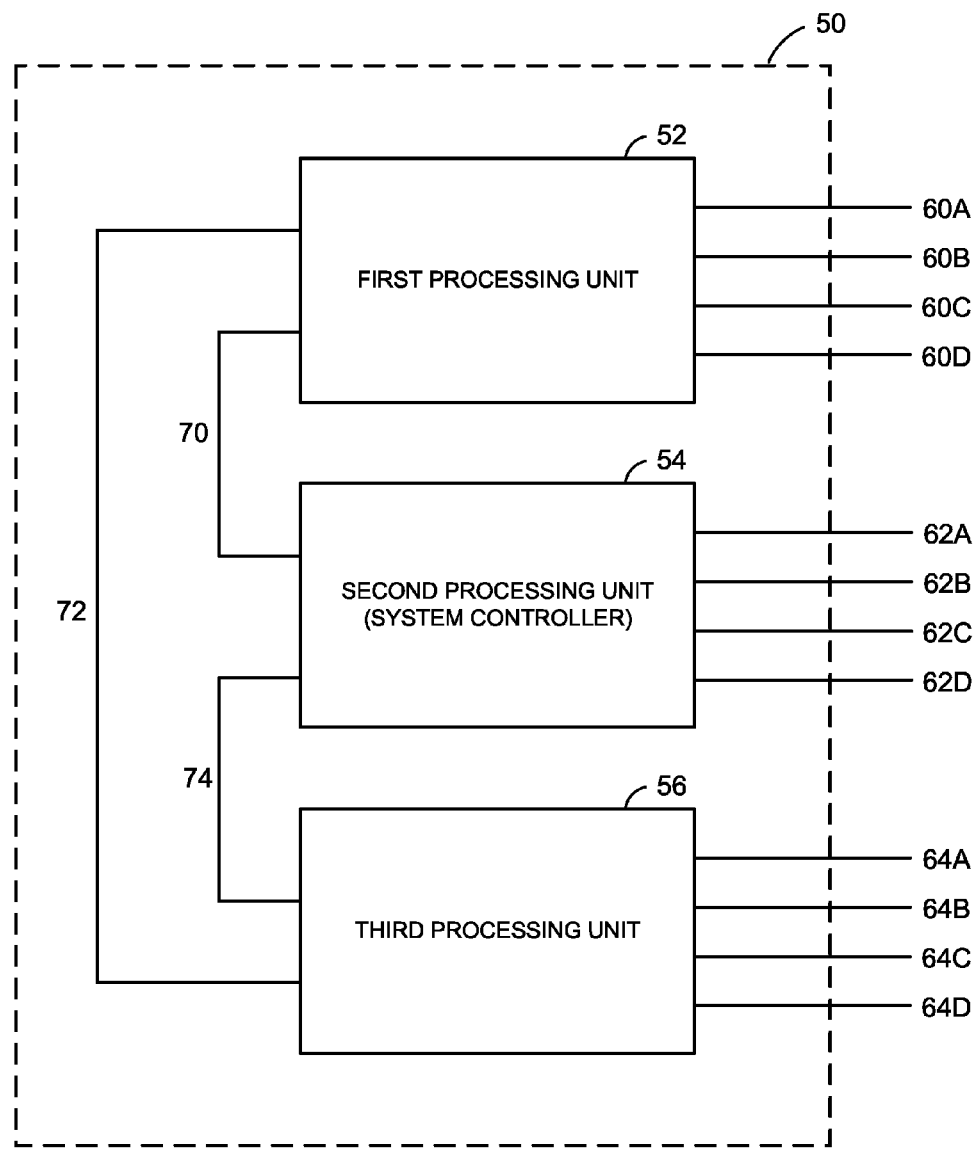
FIG. 2 is a block diagram of another example system, in a network, that utilizes dynamic bit repurposing techniques of the present disclosure, according to an embodiment.

FIG. 2 is a block diagram of another example system 50, in a network, that utilizes dynamic bit repurposing techniques of the present disclosure, according to an embodiment. The system 50 includes at least a first processing unit 52, a second processing unit 54, and a third processing unit 56. In some embodiments, the system 50 is a single network device (e.g., a switching device), and the processing units 52, 54, 56 are processing engines, or stages of one or more processing engines, within the network device 50. For example, the processing units 52, 54, 56 are units in a hardware pipeline in a single network device (e.g., in one or more ASICs in the device), in an embodiment. In other embodiments, the processing units 52, 54, 56 are different network devices, or processing engines or engine stages within different network devices, within the system 50. In an embodiment, processing units 52, 54, 56, and any other processing units in system 50 not seen in FIG. 2, are designed to operate as a single logical unit that appears to the rest of the network as a single unit. In various embodiments, the first processing unit 52 and/or the third processing unit 56 is/are similar to the first processing unit 12 of FIG. 1, and/or the second processing unit 54 is similar to the second processing unit 14 of FIG. 1.

In the example system 50, the first processing unit 52 is coupled to four ports 60A-60D. Similarly, the second processing unit 54 is coupled to four ports 62A-62D and the third processing unit 56 is coupled to four ports 64A-64D. In various embodiments, various ports of ports 60A-60D, 62A-62D, and 64A-64D are ingress ports, egress ports, or ports configured to serve as both ingress ports and egress ports. Moreover, in various embodiments, the first processing unit 52 is coupled to more or fewer than four ports, the second processing unit 54 is coupled to more or fewer than four ports, and/or the third processing unit 56 is coupled to more or fewer than four ports.

In the example system 50, the first processing unit 52 is respectively coupled, via internal couplings 70, 72, to the second processing unit 54 and the third processing unit 56, and the second processing unit 54 is coupled, via an internal coupling 74, to the third processing unit 56. In one embodiment where the system 50 is a network device, the internal couplings 70, 72, 74 are purely internal connections between the various processing units 52, 54 and 56.

In the example system 50, the second processing unit 54 serves as (or includes) a system controller for the entire system 50. For example, in an embodiment where the system 50 is a routing device, the second processing unit 54 performs the primary routing functions (e.g., makes routing determinations for packets received by the routing device 50, calculates shortest-length routing paths, etc.).

In some embodiments, the second processing unit 54 makes decisions based on information determined at the first processing unit 52. For example, in an embodiment where the system 50 is a routing device, the second processing unit 54 makes routing decisions for a packet based on the port(s) on which the packet was received. In scenarios where the second processing unit 54 directly receives the packet via one of ports 62A-62D, the second processing unit 54 can, in some embodiments, directly determine the receive port. In some embodiments and scenarios where the first processing unit 52 instead receives the packet via one of ports 60A-60D, however, the second processing unit 54 cannot directly determine the port on which the packet was received. Therefore, in some of these embodiments and scenarios, the second processing unit 54 relies on information added to the packet by the first processing unit 52.

To provide the information to the second processing unit 54, in an embodiment, the first processing unit 52 i) determines the port(s) of ports 60A-60D on which the packet was received, ii) determines that the second processing unit 54 will not utilize one or more protocol-defined control parameters to process the packet (e.g., using a pattern matching module similar to pattern matching module 20 of FIG. 1), and iii) utilizes a bit writing module similar to bit writing module 22 of FIG. 1 to overwrite the bits of the unused protocol-defined field(s) with bits indicating the receive port(s) of the packet. For example, in one embodiment, a bit writing module of the first processing unit 52 overwrites the bits of an unused field with the receive port number(s) (or other unique port identifier(s)), and/or with receive port LAG number(s). In an embodiment, the first processing unit 52 then passes the updated packet to the second processing unit 54, which uses the receive port information to determine routing services for the packet.

In some embodiments, the first processing unit 52 also overwrites one or more additional protocol-defined fields of the received packet (e.g., with metadata tag bits indicating to the second processing unit 54 that the receive port information is available, as described above with reference to FIG. 1). The second processing unit 54 then processes the packet (received from the first processing unit 52 via internal coupling 70), including the receive port information added by the first processing unit 52, to determine the proper routing for the packet. In one example embodiment and scenario, the second processing unit 54 determines that the packet should be forwarded to a device connected directly or indirectly to one or more of ports 64A-64D, and provides the packet to the third processing unit 56 (via the internal coupling 74) for transmission over the designated port(s). In an embodiment, the second processing unit 54 conveys the transmit port information to the third processing unit 56 by overwriting one or more unused protocol-defined fields of the packet, in a manner similar to the operation of the first processing unit 52 described above.

In some embodiments, the second processing unit 54 or the third processing unit 56 restores one or more of the overwritten protocol-defined fields to their original values (e.g., their values when the packet was received by the first processing unit 52) before the packet is transmitted via one or more of ports 64A-64D. To this end, the system 50 includes a memory (or accesses an external memory) that stores the original bits, in an embodiment. Moreover, in some embodiments, the third processing unit 56 includes pattern matching and bit writing capabilities similar to the first processing unit 52, such that receive port information can also be written over protocol-defined bits/fields for packets that are instead received via one or more of ports 64A-64D.

Figure 3:
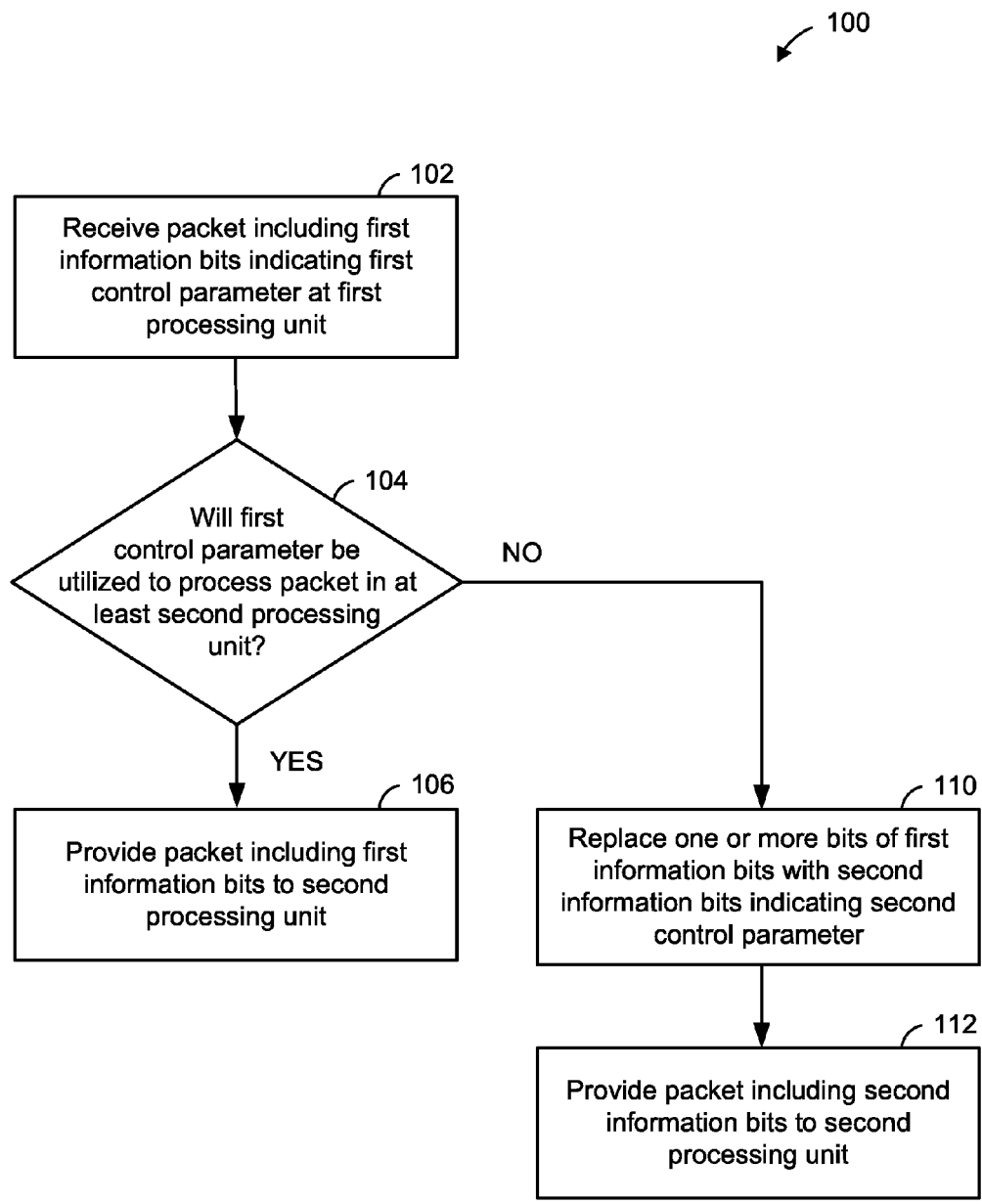
FIG. 3 is a flow diagram of an example method for conveying information not included in a standard protocol-defined field between processing units, according to an embodiment.

FIG. 3 is a flow diagram of a method 100 for conveying information not included in a standard protocol-defined field between processing units, according to an embodiment. The method 100 is implemented within a processing unit (e.g., a processing engine within a network device, or a stage within a processing engine). For example, in one embodiment, the method 100 is implemented by the first processing unit 12 of FIG. 1. As another example, in an embodiment, the method 100 is implemented by the first processing unit 52 of FIG. 2. In some embodiments, the method 100 is repeated for each received packet.

At block 102, a packet is received at a first processing unit (e.g., the first processing unit 12 of FIG. 1 or the first processing unit 52 of FIG. 2, in various embodiments). In various embodiments, the packet is received from a network, or a portion of the same device that includes the first processing unit. In some embodiments, the packet is received from a wide area network (WAN) or a local area network (LAN). The packet includes first information bits indicating a first control parameter. In an embodiment, a standard communication protocol (e.g., an Ethernet protocol, or a tunneling protocol according to which Ethernet frames are encapsulated) defines a field corresponding to the first control parameter, and the first information bits are arranged in the field according to the protocol. For example, in various embodiments, the first control parameter is a destination MAC address, a VLAN identifier, or a GRE sequence number. In various embodiments, the packet also includes other information bits arranged in one or more other protocol-defined control fields and/or a payload field, for example. In an embodiment, the packet is received via one or more ports (e.g., one or more ingress ports of a network device including the first processing unit).

At block 104, it is determined whether the protocol-defined first control parameter will be (or, in some embodiments, may be) utilized to process the packet (received at block 102) in at least a second processing unit. In an embodiment, the second processing unit is included in a same network device as the first processing unit. In some embodiments, the determination at block 104 is made by the first processing unit (e.g., a pattern matching module of the first processing unit, similar to the pattern matching module 20 of FIG. 1). Moreover, in some embodiments, the determination is made at least in part by comparing one or more patterns in the received packet to one or more reference patterns. For example, in one embodiment where the first control parameter is a destination MAC field as defined by a standard protocol of the received packet, it is determined whether the destination MAC address will be utilized by the second processing unit at least in part by determining whether a destination IP address of the received packet matches a destination IP address associated with the first and/or second processing unit (e.g., a destination IP address of a network device that includes the first and/or second processing unit). In some embodiments, the determination at block 104 is not specific to the second processing unit. For example, in one embodiment where the first processing unit and the second processing unit are included in a network device, it is determined at block 104 whether the network device as a whole (including the second processing unit) will utilize the first control parameter to process the packet. Moreover, in some embodiments, the determination at block 104 is inherently made as a result of one or more other determinations. For example, in one embodiment where the second processing unit processes either the first control parameter or a second control parameter (but not both control parameters) of a given packet, determining that the second control parameter will (or may) be utilized is equivalent to determining that the first control parameter will not be utilized. In other embodiments, whether each control parameter will (or may) be utilized is explicitly determined.

If it is determined at block 104 that the protocol-defined first control parameter will (or may) be utilized to process the packet in at least the second processing unit, flow proceeds to block 106. At block 106, the packet including the first information bits (indicating the first control parameter) is provided to the second processing unit. In one embodiment and/or scenario, the packet is provided directly to the second processing unit by the first processing unit. In another embodiment and/or scenario, the packet is provided to the second processing unit by the first processing unit via one or more intervening processing units.

If it is instead determined at block 104 that the protocol-defined first control parameter will not be utilized to process the packet in the second processing unit, flow proceeds to block 110. At block 110, one or more bits of the first information bits (corresponding to the protocol-defined first control parameter) in the packet are replaced with second information bits that indicate a second control parameter that is not defined by the standard protocol of the packet received at block 102. For example, in one embodiment where the standard protocol is an Ethernet protocol, the non-protocol second control parameter generally or specifically identifies the port(s) on which a packet was received (e.g., a unique identifier of each receive port such as a port number, or a LAG number associated with each receive port). In an embodiment, block 110 is implemented by a bit writing module such as bit writing module 22 of FIG. 1.

At block 112, the packet including the second information bits (indicating the non-protocol second control parameter) is provided to the second processing unit. In one embodiment and/or scenario, the packet is provided directly to the second processing unit by the first processing unit. In another embodiment and/or scenario, the packet is provided to the second processing unit by the first processing unit via one or more intervening processing units.

In some embodiments, blocks 110 and 112 only occur if one or more conditions are satisfied in addition to determining (at block 104) that the protocol-defined first control parameter will not be utilized to process the packet in the second processing unit. For example, in one embodiment, flow only proceeds to block 110 if it is also explicitly determined that the second processing unit will (or may) utilize the non-protocol second control parameter to process the packet.

In some embodiments, the method 100 includes one or more additional steps not seen in FIG. 3. For example, in various embodiments and/or scenarios, the method 100 further includes, after block 106, processing the first information bits in the second processing unit, and/or includes, after block 112, processing the second information bits in the second processing unit. As another example, in an embodiment, blocks 102 and 104, and either block 106 or blocks 110 and 112, are repeated for a second packet. In one scenario, for example, blocks 102, 104, 110, and 112 are implemented for a first packet, while blocks 102, 104, and 106 are implemented for a second packet received before or after the first packet.

As yet another example, in some embodiments, the method 100 includes additional blocks after the block 112 in which the second information bits of the packet are processed at the second processing unit, and the packet is then at least partially restored to its original form (i.e., as the packet was arranged when received at block 102) by replacing the second information bits in the packet with the corresponding original bits from the first information bits (i.e., replacing each overwritten bit of the protocol-defined control field with its original value). In some of these embodiments, the method 100 further includes a first additional block, prior to block 110 (e.g., between blocks 104 and 110) in which the original bits are stored in a memory, and a second additional block, prior to replacing the second information bits with the original bits (e.g., after block 112), in which the original bits are retrieved from the memory. In various embodiments, the memory (e.g., a first-in-first-out (FIFO) buffer) is included in the first processing unit, the second processing unit, or another suitable location.

As still another example, in some embodiments, the method 100 includes extra steps for repurposing bits of an additional protocol-defined control field, where the additional repurposed bits serve as a metadata tag. In these embodiments, the method 100 includes an additional block (e.g., between blocks 104 and 110, or between blocks 110 and 112) in which third information bits of the packet received at block 102 (e.g., information bits indicating an additional protocol-defined control parameter) are replaced with fourth information bits that serve as a metadata tag. Specifically, the fourth information bits indicate that the non-protocol second control parameter is available (e.g., available for processing at the second processing unit). In one example embodiment, the third information bits are included in a VLAN identifier field of the received packet according to the protocol, and indicate a VLAN identifier of the packet. In another example embodiment, the third information bits are included in a field of a tunneling header of the received packet according to the protocol, and indicate tunneling information (e.g., a GRE sequence number) of the packet. In some of these embodiments, the method 100 also includes a block in which it is determined, at the second processing unit, that the non-protocol second control parameter (indicated by the second information bits added at block 110) is available for processing (e.g., by determining that the fourth information bits of the metadata tag indicate that the second control parameter is available).

Figure 4:
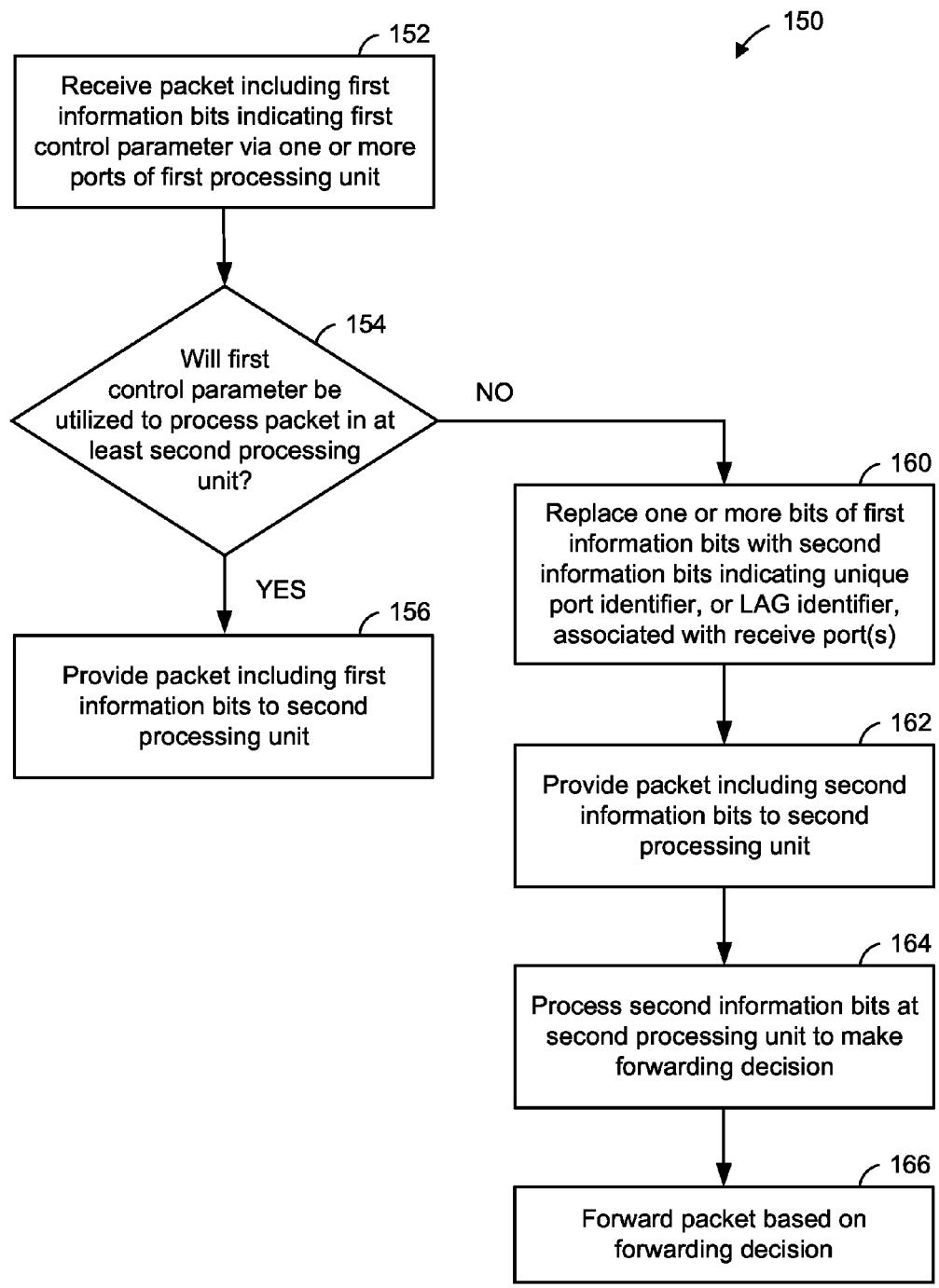
FIG. 4 is a flow diagram of an example method for conveying receive port information not included in a standard protocol-defined field between processing units, according to an embodiment.

FIG. 4 is a flow diagram of a method 150 that represents a particular embodiment of the method 100. Specifically, the method 150 is a method for conveying receive port information that is not included in a standard, protocol-defined field between processing units, according to an embodiment.

In an embodiment, the method 150 is implemented within two or more processing units of a switching device. For example, in one embodiment, blocks 152, 154, 156, 160, and 162 are implemented by the first processing unit 52 of FIG. 2 and blocks 156, 164, and 166 are implemented by the second processing unit 54 and/or the third processing unit 56 of FIG. 2. In some embodiments, the method 150 is repeated for each received packet.

At block 152, a packet is received at a first processing unit (e.g., the first processing unit 52 of FIG. 2, in an embodiment). In an embodiment, the packet is received from a network via one or more ports of the first processing unit. The packet includes first information bits indicating a first control parameter. In an embodiment, a standard communication protocol (e.g., an Ethernet protocol, or a tunneling protocol according to which Ethernet frames are encapsulated) defines a field corresponding to the first control parameter, and the first information bits are arranged in the field according to the protocol. For example, in various embodiments, the first control parameter is a user priority, a destination MAC address, a VLAN identifier, or a GRE sequence number.

At block 154, it is determined whether the protocol-defined first control parameter will be (or, in some embodiments, may be) utilized to process the packet (received at block 152) in at least a second processing unit. In an embodiment, block 154 is similar to block 104 of the method 100.

If it is determined at block 154 that the protocol-defined first control parameter will (or may) be utilized to process the packet in at least the second processing unit, flow proceeds to block 156. At block 156, the packet including the first information bits (indicating the first control parameter) is provided to the second processing unit. In an embodiment, block 156 is similar to block 106 of method 100.

If it is instead determined at block 154 that the protocol-defined first control parameter will not be utilized to process the packet in at least the second processing unit, flow proceeds to block 160. At block 160, one or more bits of the first information bits in the packet are replaced with second information bits that indicate the port or ports via which the packet was received at block 152. For example, in various embodiments, the second information bits indicate one or more unique port identifiers (e.g., port numbers) of the receive port(s), or indicate LAG number(s) associated with the receive port(s). In an embodiment, the standard protocol of the packet received at block 152 does not define any field for indicating the port(s) via which a packet is received (i.e., does not assign any field intended to include information such as the second information bits). In an embodiment, block 160 is similar to block 110 of method 100.

At block 162, the packet including the second information bits (indicating the receive port(s)) is provided to the second processing unit. In an embodiment, block 162 is similar to block 112 of method 100.

At block 164, the second information bits indicating the non-protocol receive port information are processed at the second processing unit to make a forwarding decision for the packet. For example, in one embodiment and scenario where the second processing unit determines that the packet should be broadcast, the second processing unit examines the second information bits to determine the port(s) (or LAG number(s) associated with the port(s)) on which the packet was received, and excludes the port(s) (or all ports having the same LAG number(s)) from the ports selected for the broadcast.

At block 166, the packet is forwarded based on the forwarding decision made by the second processing unit at block 164. In one embodiment, the second processing unit forwards the packet. In another embodiment, the second processing unit provides the packet to a third processing unit (directly, or indirectly via one or more intervening processing units), which in turn forwards the packet. For example, in one embodiment, the first processing unit 52 of FIG. 2 implements blocks 152, 154, 156, 160, and 162 of method 150, the second processing unit 54 of FIG. 2 implements block 164 of method 150, and the third processing unit 56 of FIG. 2 implements block 166 of method 150.

In some embodiments, the example method 150 includes one or more additional steps not seen in FIG. 4. For example, in various embodiments and/or scenarios, the method 150 further includes, after block 156, processing the first information bits in the second processing unit. As another example, in an embodiment, blocks 152 and 154, and either block 156 or blocks 160, 162, 164, and 166, are repeated for a second packet. In one scenario, for example, blocks 152, 154, 160, 162, 164, and 166 are implemented for a first packet, while blocks 152, 154, and 156 are implemented for a second packet received before or after the first packet.

Figure 5:
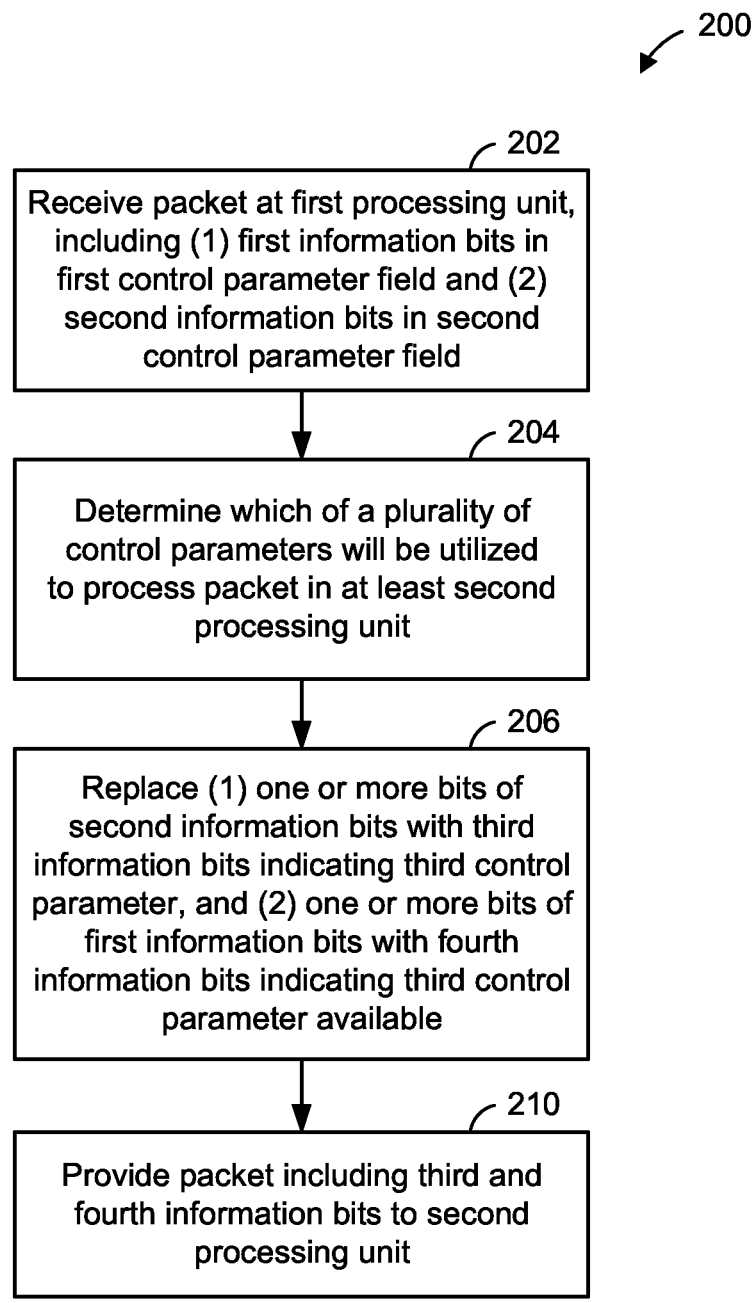
FIG. 5 is a flow diagram of an example method for conveying information not included in a standard protocol-defined field between processing units by repurposing the bits of multiple protocol-defined fields, according to an embodiment.

FIG. 5 is a flow diagram of one embodiment of a method 200 for conveying information not included in a standard protocol-defined field from one processing unit to another processing unit by repurposing the bits of multiple, standard protocol-defined fields. In an embodiment, the method 200 is implemented within a processing unit (e.g., a processing engine within a network device, or a stage within a processing engine). For example, in one embodiment, the method 200 is implemented by the first processing unit 12 of FIG. 1. As another example, in an embodiment, the method 200 is implemented by the first processing unit 52 of FIG. 2. In some embodiments, the method 200 is repeated for each received packet.

At block 202, a packet is received at a first processing unit (e.g., the first processing unit 12 of FIG. 1 or the first processing unit 52 of FIG. 2, in various embodiments). In various embodiments, the packet is received from a network, or another portion of the same device that includes the first processing unit. In some embodiments, the packet is received from a WAN or a LAN. The packet includes first information bits arranged in a first field corresponding to a first control parameter according to a standard communication protocol (e.g., an Ethernet protocol, or a tunneling protocol according to which Ethernet frames are encapsulated). The packet also includes second information bits arranged in a second field corresponding to a second control parameter according to the same protocol. For example, in various embodiments, the first control parameter is a VLAN identifier or a GRE sequence number of an Ethernet or tunneling protocol, and the second control parameter is a user priority or a destination MAC address of the same protocol. In various embodiments, the packet also includes other information bits arranged in one or more other protocol-defined control fields and/or a payload field, for example. In an embodiment, the packet is received via one or more ports (e.g., ingress ports of a network device including the first processing unit).

At block 204, it is determined which of a plurality of control parameters will be (or, in some embodiments, may be) utilized to process the packet (received at block 202) in at least a second processing unit. In an embodiment, the second processing unit is included in a same network device as the first processing unit. The plurality of control parameters includes the protocol-defined second control parameter (corresponding to the second information bits in the packet received at block 202) and a third control parameter for which the protocol of the received packet does not define a corresponding field. For example, in one embodiment where the protocol is an Ethernet protocol, the third control parameter indicates the port(s) on which a packet was received (e.g., a unique port identifier of each receive port such as a port number, or a LAG number associated with each receive port). As another example, in an embodiment where the protocol is an Ethernet protocol, the third control parameter identifies whether a packet exceeds a quota and is therefore discard eligible.

In some embodiments, the plurality of control parameters subject to the determination at block 204 does not include the protocol-defined first control parameter. For example, in one embodiment, the processing unit implementing the method 200 assumes that the first control parameter will not be utilized in at least the second processing unit, and therefore assumes that one or more of the first information bits can be overwritten. In other embodiments, the plurality of control parameters subject to the determination at block 204 does include the first control parameter. For example, in one embodiment, the processing unit implementing the method 200 checks whether any of the first information bits can be overwritten in the same manner that the processing unit checks whether any of the second information bits can be overwritten. In still other embodiments, the plurality of control parameters subject to the determination at block 204 includes one or more additional standard and/or non-standard control parameters (i.e., one or more additional protocol-defined control parameters of fields that are in some scenarios selectively overwritten, and/or one or more additional non-protocol control parameters that in some scenarios replace unused protocol-defined control parameters).

In some embodiments, the determination at block 204 is made by the first processing unit (e.g., a pattern matching module of the first processing unit, similar to the pattern matching module 20 of FIG. 1). Moreover, in some embodiments, the determination is made at least in part by comparing one or more patterns in the received packet to one or more reference patterns (e.g., as described above with reference to FIG. 1).

At block 206, at least partially in response to a determination at block 204 that the non-protocol third control parameter will or may be utilized to process the packet in at least the second processing unit, one or more of the second information bits in the packet are replaced with third information bits indicating the third control parameter. Also at block 206, and also at least partially in response to a determination at block 204 that the non-protocol third control parameter will or may be utilized to process the packet in at least the second processing unit, one or more of the first information bits in the packet are replaced with fourth information bits indicating that the third control parameter is now available (e.g., available for processing at the second processing unit). Thus, the fourth information bits serve as a metadata tag that informs the second processing unit as to which type of control data is present at the packet location that originally corresponded to the protocol-defined second control parameter. In an embodiment, block 206 is implemented by a bit writing module such as bit writing module 22 of FIG. 1.

In some embodiments, the replacement of bits at block 206 is also partially in response to an explicit determination at block 204 that the protocol-defined second control parameter will not be utilized to process the packet in at least the second processing unit, and/or (if the plurality of control parameters includes the first control parameter) that the protocol-defined first control parameter will not be utilized to process the packet in at least the second processing unit.

At block 210, the packet including the third information bits and fourth information bits (corresponding to the newly added, non-protocol control parameter and the metadata tag, respectively) is provided to the second processing unit. In one embodiment and/or scenario, the packet is provided directly to the second processing unit by the first processing unit. In another embodiment and/or scenario, the packet is provided to the second processing unit by the first processing unit via one or more intervening processing units.

In one specific example embodiment of the method 200, the protocol-defined first control parameter is a VLAN identifier, the protocol-defined second control parameter is a user priority, and the non-protocol third parameter is a receive port indicator. In this embodiment, a first value written into the original VLAN field indicates to the second processing unit that the protocol-defined user priority parameter is available, and a second value written into the original VLAN field indicates to the second processing unit that the non-protocol receive port indicator is available.

In some embodiments, the example method 200 includes one or more additional steps not seen in FIG. 5. For example, in various embodiments and/or scenarios, the method 200 further includes, after block 210, processing the fourth (metadata tag) information bits in the second processing unit to determine that the non-protocol third control parameter is available, and in response to that determination processing the third information bits (representing the third control parameter) in the second processing unit. As another example, in some embodiments, the method 200 includes additional blocks after the block 210 in which the third information bits representing the non-protocol third control parameter are processed at the second processing unit, and the packet is then at least partially restored to its original form (i.e., as the packet was arranged when received at block 202) by replacing the third information bits in the packet with the portion of the second information bits that was overwritten at block 206, and/or by replacing the fourth (metadata tag) information bits in the packet with the portion of the first information bits that was overwritten at block 206. In some of these embodiments, the method 200 further includes a first additional block, prior to block 206 (e.g., between blocks 204 and 206) in which the replaced portion(s) of the first information bits and/or second information bits are stored in a memory prior to being overwritten, and a second additional block (prior to replacing the third information bits and/or fourth information bits with the original information bits) in which the replaced portion(s) of the first information bits and/or second information bits are retrieved from the memory. In various embodiments, the memory (e.g., a FIFO buffer) is included in the first processing unit, the second processing unit, or a different suitable location.

While the embodiments described above refer to various ways of processing a "packet" (e.g., making decisions/determinations based on the packet, replacing bits within the packet, etc.), this term is used for ease of explanation, and it is to be understood that the embodiments described above, as well as the claims included herein, encompass not only the processing of the packet itself, but also the processing of a portion of the received packet (e.g., a packet preamble and/or header), as well as the processing of a data structure corresponding to the packet (e.g., a packet descriptor), unless a contrary meaning is clearly indicated.

Moreover, while the embodiments above have been described with respect to particular examples of non-protocol information/metadata that may be conveyed between devices or units (e.g., receive port information), other suitable types of non-protocol information are conveyed in other embodiments. Non-limiting examples of other types of non-protocol information that may be conveyed include: (i) a packet "color" with respect to quota conformance (e.g., green, yellow, or red), (ii) a flow identifier (e.g., a flow identifier assigned by a first processing unit that is utilized by a second, downstream processing unit), (iii) information concerning geographical location (e.g., an identifier of the particular data center in which a packet sender is currently located), (iv) a sampling bucket identification number, (v) non-standard quality-of-service assessment information, (vi) a resource allocation request or reservation (e.g., a priority of the packet to be utilized when placing the packet into a queue), (vii) non-standard buffer allocation information, (viii) a safety/security "suspicion level," (ix) a customer identifier (e.g., a billing code), and (x) an indicator that a frame is or is not to be counted for a particular purpose or operation.

In some embodiments, the dynamic bit repurposing techniques described above are implemented in hardware, firmware, and/or software. For example, the first processing unit 12 and/or second processing unit 14 of FIG. 1 are, in whole or in part, implemented by hardware, firmware, or software, in an embodiment. In some of these embodiments, the blocks, operations, techniques, etc., are implemented in, for example, a custom integrated circuit (IC), an application specific integrated circuit (ASIC), a programmable logic device (PLD), a field programmable logic array (FPGA), a programmable logic array (PLA), etc.

Embodiments of the present disclosure may be embodied in any type of router or other network device used in a wired or wireless communication system including, for example, devices used in communication systems including or coupled to a wired or wireless LAN or a wired or wireless WAN, Internet, cable and satellite-based communication systems (such as Internet, data, video and voice communication systems), wireless telephone systems (including cellular phone systems, voice over internet protocol (VoIP) systems, home-based wireless telephone systems), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of processing one or more packets, the method comprising:
   receiving, at a first processing unit that is implemented on an integrated circuit of a network device, a first data structure corresponding to a first packet having a first header, the first data structure including a first field of the first header, the first field including first information bits that conform to a standard communication protocol, wherein the first information bits indicate a first control parameter, wherein the first data structure includes one or more second fields of the first header, and wherein the one or more second fields of the first data structure includes second information bits;
   determining whether the first control parameter will be utilized to process the first packet in at least a second processing unit that is implemented on the integrated circuit of the network device; and
   at least partially in response to determining that the first control parameter will not be utilized to process the first packet in at least the second processing unit,
      overwriting, in the first data structure, one or more bits of the first information bits with third information bits, wherein the third information bits indicate a second control parameter that is a different type of information than the first control parameter, and wherein the second information bits do not conform to the standard communication protocol,
      overwriting, in the first data structure, one or more bits of the second information bits with fourth information bits, wherein the fourth information bits indicate the second control parameter is available, and
   providing the first data structure that includes i) the third information bits and ii) the one or more second fields of the first header to the second processing unit of the network device.

2. A method according to claim 1, wherein determining whether the first control parameter will be utilized to process the first packet in at least the second processing unit comprises comparing at least a first pattern in the first data structure to at least one reference pattern.

3. A method according to claim 1, wherein in response to determining that the first control parameter will not be utilized to process the first packet in at least the second processing unit, the method further comprises:
   processing, in the second processing unit, the third information bits in the first data structure.

4. A method according to claim 3, further comprising:
   after processing the second information bits, overwriting, in the first data structure, the third information bits with the one or more bits of the first information bits.

5. A method according to claim 4, further comprising:
   prior to overwriting the one or more bits of the first information bits in the first data structure with the third information bits, storing the one or more bits of the first information bits in a memory; and
   prior to overwriting the third information bits in the first data structure with the one or more bits of the first information bits, retrieving the one or more bits of the first information bits from the memory.

6. A method according to claim 1, wherein the second information bits indicate (i) a virtual local area network (VLAN) identifier of the received first packet, or (ii) tunneling information associated with the received first packet.

7. A method according to claim 1, further comprising:
   determining, in the second processing unit, whether the fourth information bits indicate the second control parameter is available; and
   at least partially in response to determining that the fourth information bits indicate the second control parameter is available, processing, in the second processing unit, the second information bits in the first data structure.

8. A method according to claim 1, further comprising:
   receiving, at the first processing unit, a second data structure corresponding to a second packet having a second header, the second data structure including a third field of the second header, the third field including fifth information bits, wherein the fifth information bits indicate the first control parameter, and wherein the second data structure includes one or more fourth fields of the second header;
   determining, in the first processing unit, whether the first control parameter will or may be utilized to process the second packet in at least the second processing unit; and
   at least partially in response to determining that the first control parameter will or may be utilized to process the second packet in at least the second processing unit, providing the second data structure, including the fifth information bits, to the second processing unit.

9. A method according to claim 1, wherein:
   the first control parameter is an address,
   the first packet is received via one or more ports coupled to the first processing unit,
   the second control parameter is at least one of (i) a unique port identifier, or (ii) a link aggregation group (LAG) number, and
   the third information bits correspond to at least one of (i) a unique port identifier associated with the one or more ports coupled to the first processing unit, or (ii) a LAG number associated with the one or more ports coupled to the first processing unit.

10. A method according to claim 1, wherein:
the first control parameter is a destination media access control (MAC) address,
determining whether the first control parameter will be utilized to process the first packet in at least the second processing unit comprises determining whether a destination IP address of the first packet is associated with the first processing unit or the second processing unit, and the second control parameter is one of (i) a unique port identifier, (ii) a link aggregation group (LAG) number, or (iii) an indication that a quota has been exceeded.

11. A network device, comprising:
an integrated circuit;
a first processing unit, implemented on the integrated circuit, configured to receive a data structure corresponding to a packet having a header, the data structure including a first field of the header, the first field including first information bits that conform to a standard communication protocol, wherein the first information bits indicate a first control parameter, wherein the data structure includes one or more second fields of the header, wherein the one or more second fields of the first data structure includes second information bits, and wherein the first processing unit includes
a pattern matching module, implemented on the integrated circuit, configured to determine whether the first control parameter will be utilized to process the packet in at least a second processing unit, implemented on the one or more integrated circuits, of the network device, and
a bit writing module, implemented on the integrated circuit, configured to, at least partially in response to a determination by the pattern matching module that the first control parameter will not be utilized to process the packet in at least the second processing unit,
overwrite, in the data structure, one or more bits of the first information bits with third information bits that do not conform to the standard communication protocol, wherein the third information bits indicate a second control parameter, the second control parameter being a different type of information than the first control parameter, and
overwrite, in the data structure, one or more bits of the second information bits with fourth information bits, wherein the fourth information bits indicate the second control parameter is available,
wherein the first processing unit is further configured to provide the data structure that includes i) the second information bits and ii) the one or more second fields of the header to the second processing unit.

12. A network device according to claim 11, further comprising the second processing unit, wherein the second processing unit is configured to process the third information bits in the data structure.

13. A network device according to claim 12, further comprising a memory, and wherein:
the first processing unit is further configured to store the one or more bits of the first information bits in the memory, and
at least one processing unit, implemented on the integrated circuit, in the network device is configured to retrieve the one or more bits of the first information bits from the memory, and overwrite, in the data structure, the third information bits with the retrieved one or more bits of the first information bits after processing the second information bits.

14. A network device according to claim 11, wherein the second information bits indicate one of (i) a virtual local area network (VLAN) identifier of the packet, or (ii) tunneling information associated with the packet.

15. A network device according to claim 11, further comprising the second processing unit, wherein the second processing unit is configured to:
determine whether the fourth information bits indicate the second control parameter is available, and
at least partially in response to a determination that the fourth information bits indicate the second control parameter is available, process the second information bits in the data structure.

16. A network device according to claim 11, further comprising a plurality of ports coupled to the first processing unit, and wherein:
the first control parameter is an address,
the first processing unit is configured to receive the packet via one or more ports of the plurality of ports coupled to the first processing unit,
the second control parameter is at least one of (i) a unique port identifier, or (ii) a link aggregation group (LAG) number, and
the third information bits correspond to at least one of (i) a unique port identifier associated with the one or more ports coupled to the first processing unit, or (ii) a LAG number associated with the one or more ports coupled to the first processing unit.

17. A network device according to claim 11, wherein:
the first control parameter is a destination media access control (MAC) address,
the pattern matching module is configured to determine whether the first control parameter will be utilized to process the packet in at least the second processing unit at least in part by determining whether a destination IP address of the packet is associated with the first processing unit or the second processing unit, and
the second control parameter is one of (i) a unique port identifier, (ii) a link aggregation group (LAG) number, or (iii) an indication that a quota has been exceeded.

18. A method of processing one or more packets, the method comprising:
receiving, at a first processing unit implemented on an integrated circuit, a data structure corresponding to a packet having a header, the data structure including a first field of the header and a second field of the header, the first field including first information bits, wherein the first field corresponds to a first control parameter according to a standard communication protocol,
and the second field including second information bits, wherein the second field corresponds to a second control parameter according to the standard communication protocol;
determining which of a plurality of control parameters will or may be utilized to process the packet in at least a second processing unit, the second processing unit implemented on the integrated circuit, wherein the plurality of control parameters includes at least the second control parameter and a third control parameter, and wherein the standard communication protocol does not define a corresponding header field for the third control parameter;

at least partially in response to i) a determination that the third control parameter will or may be utilized to process the packet in at least the second processing unit, and ii) a determination that the second control parameter will not be utilized to process the packet in at least the second processing unit, overwriting data structure (a) one or more bits of the second information bits with third information bits not conforming to the standard communication protocol, wherein the third information bits indicate the third control parameter, and (b) one or more bits of the first information bits with fourth information bits not conforming to the standard communication protocol, wherein the fourth information bits indicate the third control parameter is available; and providing the data structure that includes the third information bits and the fourth information bits to the second processing unit.

19. A method according to claim 18, wherein:

the plurality of control parameters further includes the first control parameter, and overwriting, in the data structure, one or more bits of the first information bits with the fourth information bits is further in response to a determination that the first control parameter will not be utilized to process the packet in at least the second processing unit.

20. A method according to claim 18, further comprising:

determining, at the second processing unit and based at least in part on the fourth information bits, that the third control parameter is available; and processing, in the second processing unit, the third information bits in the packet.

21. A method according to claim 18, wherein the first field is either (i) a virtual local area network (VLAN) identifier field according to the protocol, or (ii) a field of a tunneling header according to the protocol.

22. A network device, comprising:

an integrated circuit;

a first processing unit, implemented on the integrated circuit, configured to receive a data structure corresponding to a packet having a header, the data structure including a first field of the header and a second field of the header, the first field including first information bits, wherein the first field corresponds to a first control parameter according to a standard communication protocol, and the second field including second information bits, wherein the second field corresponds to a second control parameter according to the standard communication protocol, and wherein the first processing unit includes a pattern matching module, implemented on the integrated circuit, configured to determine which of a plurality of control parameters will or may be utilized to process the packet in at least a second processing unit, implemented on the integrated circuit, wherein the plurality of control parameters includes at least the second control parameter and a third control parameter, and wherein the standard communication protocol does not define a corresponding field for the third control parameter, and a bit writing module, implemented on the integrated circuit, configured to, when the pattern matching module determines that the third control parameter will or may be utilized to process the packet in at least the second processing unit, and determines that the second control parameter will not be utilized to process the packet in at least the second processing unit, (i) overwrite, in the data structure, one or more bits of the second information bits with third information bits not conforming to the standard communication protocol, wherein the third information bits indicate the third control parameter, and (ii) overwrite, in the data structure, one or more bits of the first information bits with fourth information bits not conforming to the standard communication protocol, wherein the fourth information bits indicate the third control parameter is available, wherein the first processing unit is further configured to provide the data structure that includes the third information bits and the fourth information bits to the second processing unit.

23. A network device according to claim 22, wherein the first field is a virtual local area network (VLAN) identifier field according to the protocol.

24. A network device according to claim 22, wherein the first field is a field in a tunneling header according to the protocol.

25. A network device according to claim 22, wherein:

the plurality of control parameters further includes a fourth control parameter for which the protocol does not define a corresponding field, and the bit writing module is configured to, when the pattern matching module instead determines that the fourth control parameter will or may be utilized to process the packet in at least the second processing unit, (i) overwrite, in the data structure, one or more bits of the second information bits with fifth information bits, wherein the fifth information bits indicate the fourth control parameter, and (ii) overwrite, in the data structure, one or more bits of the first information bits with sixth information bits, wherein the sixth information bits indicate the fourth control parameter is available.

26. A network device according to claim 22, wherein the bit writing module is configured to, when the pattern matching module instead determines that the second control parameter will or may be utilized to process the packet in at least the second processing unit, overwrite, in the data structure, one or more bits of the first information bits in the packet with fifth information bits, wherein the fifth information bits indicate the second control parameter is available.

* * * * *